United States Patent
Waterman et al.

(10) Patent No.: US 8,491,700 B2
(45) Date of Patent: Jul. 23, 2013

(54) METHODS AND SYSTEMS FOR RECOVERING RHENIUM FROM A COPPER LEACH

(71) Applicant: Freeport-McMoran Corporation, Phoenix, AZ (US)

(72) Inventors: Brett T. Waterman, Tucson, AZ (US); Steve Nels Dixon, Safford, AZ (US); Theresa Linne Morelli, Safford, AZ (US); George Owusu, Thornton, CO (US); Stefka Todorova Ormsby, Tucson, AZ (US)

(73) Assignee: Freeport-McMoran Corporation, Phoenix, AZ (US)

( * ) Notice: Subject to any disclaimer, the term of this patent is extended or adjusted under 35 U.S.C. 154(b) by 0 days.

(21) Appl. No.: 13/724,860

(22) Filed: Dec. 21, 2012

(65) Prior Publication Data
US 2013/0118310 A1    May 16, 2013

Related U.S. Application Data

(60) Continuation of application No. 13/588,448, filed on Aug. 17, 2012, now Pat. No. 8,361,192, which is a division of application No. 12/424,863, filed on Apr. 16, 2009, now abandoned.

(51) Int. Cl.
*B01D 15/00* (2006.01)
*B01D 15/04* (2006.01)
*C22B 3/04* (2006.01)
*C22B 9/00* (2006.01)
*C22B 61/00* (2006.01)
*C25C 1/12* (2006.01)

(52) U.S. Cl.
USPC .............. 75/711; 75/743; 205/772; 210/681; 423/24; 423/25; 423/27; 423/49

(58) Field of Classification Search
USPC ........... 75/724, 737, 744, 743; 423/49, 658.5, 423/244.08; 210/269, 340, 660, 670, 677, 210/678, 681, 684, 685
See application file for complete search history.

(56) References Cited

U.S. PATENT DOCUMENTS 2,809,092 A   10/1957   Zimmerley
2,876,065 A   3/1959    Zimmerley
(Continued)

FOREIGN PATENT DOCUMENTS

GB   1359177    7/1974
JP   60258434   12/1985
(Continued)

OTHER PUBLICATIONS

PCT International Search Report and Written Opinion from corresponding International Application No. PCT/US2010/025031 dated Apr. 23, 2010.
(Continued)

*Primary Examiner* — Kaj K Olsen
*Assistant Examiner* — Jared Wood
(74) *Attorney, Agent, or Firm* — Snell & Wilmer L.L.P.

(57) ABSTRACT

Various embodiments provide new methods of rhenium recovery. The methods can include subjecting a metal-bearing solution to an activated carbon bed, and adsorbing rhenium onto the activated carbon. The methods can also include heating a basic aqueous elution solution and eluting the rhenium from the activated carbon with the heated elution solution. The methods can also incorporate an ion exchange as a rhenium recovery apparatus.

11 Claims, 7 Drawing Sheets

U.S. PATENT DOCUMENTS

| | | | |
|---|---|---|---|
| 2,945,743 | A | 7/1960 | Zimmerley |
| 2,972,531 | A | 2/1961 | Zimmerley |
| 3,244,475 | A | 4/1966 | Churchward |
| 3,458,277 | A | 7/1969 | Platzke |
| 3,495,934 | A | 2/1970 | Ziegenbalg |
| 3,558,268 | A | 1/1971 | Prater |
| 3,672,874 | A | 6/1972 | Wiley |
| 3,739,057 | A | 6/1973 | Daugherty |
| 3,751,555 | A | 8/1973 | Peterson |
| 3,798,305 | A | 3/1974 | Pagnozzi |
| 3,855,385 | A | 12/1974 | Derosset |
| 3,856,915 | A | 12/1974 | Pagnozzi |
| 3,862,292 | A | 1/1975 | Bauer et al. |
| 3,915,690 | A | 10/1975 | Ammann et al. |
| 3,932,579 | A | 1/1976 | Morgan |
| 4,000,244 | A | 12/1976 | Mollerstedt |
| 4,006,212 | A | 2/1977 | Alper |
| 4,049,771 | A | 9/1977 | Quatrini |
| 4,185,078 | A | 1/1980 | Quatrini |
| 4,188,208 | A | 2/1980 | Guay |
| 4,278,641 | A | 7/1981 | Petrov |
| 4,521,381 | A | 6/1985 | Douglas |
| 4,557,906 | A | 12/1985 | Douglas |
| 4,572,823 | A | 2/1986 | Ogata |
| 4,599,153 | A | 7/1986 | Bright |
| 4,774,003 | A | 9/1988 | Miller |
| 4,816,235 | A | 3/1989 | Pesic |
| 5,215,574 | A | 6/1993 | Kladder et al. |
| 5,427,606 | A | 6/1995 | Sceresini |
| 5,605,563 | A | 2/1997 | Kidby et al. |
| 5,804,151 | A | 9/1998 | Sweetser |
| 6,494,932 | B1 | 12/2002 | Abercrombie |
| 6,936,090 | B2 | 8/2005 | Meese-Marktscheffel |
| 2003/0200839 | A1 | 10/2003 | Jenkins et al. |
| 2007/0014709 | A1 | 1/2007 | Moyes et al. |
| 2008/0118422 | A1 | 5/2008 | Amelunxen et al. |

FOREIGN PATENT DOCUMENTS

| | | |
|---|---|---|
| PL | 160950 | 3/1993 |
| RO | 98782 | 4/1990 |
| WO | WO9915276 | 4/1991 |
| WO | WO 02077302 | 10/2002 |

OTHER PUBLICATIONS

PCT International Preliminary Report on Patentability from corresponding International Application No. PCT/US2010/025031 issued Oct. 27, 2011.

Abisheva, Z.S.; Zagorodnyaya, A.N.: "Hydrometallurgy in Rare Metal Production Technology in Kazakhstan", Hydrometallurgy, vol. 63, 2002, pp. 55-63.

Troshkina, I. D., et al.: "Recovery of Rhenium From Sulfuric Acid Solutions With Activated Coals", Russian Journal of Applied Chemistry, Nauka/Interperiodica, NO LNKD-DOI: 10.1134/S1070427206090059, vol. 79, No. 9, Sep. 1, 2006, pp. 1419-1422.

Krotkov, V.V., et al.: Recovery of Rhenium as by Product of Underground Uranium Leaching In: Conference Committee: "Rhenium Molybdenum, Tungsten—Prospects for Production and Industrial Application (Proceedings)", Jun. 18, 1998, State Research Center of Russia, pp. 71-71.

Bartlett, D.A., "The Fundamentals of Heat Exchanges", The Industrial Physicist, Dec. 1996, pp. 18-21.

Non-Final Office Action from U.S. Appl. No. 12/424,863, dated Oct. 28, 2011.

Final Office Action from U.S. Appl. No. 12/424,863, dated Apr. 16, 2012.

Advisory Action and Notice of Non-Compliant Amendment from U.S. Appl. No. 12/424,863, dated Jul. 13, 2012.

Advisory Action from U.S. Appl. No. 12/424,863, dated Aug. 21, 2012.

Notice of Allowance, Examiner's Interview Summary, Examiner's Amendment from U.S. Appl. No. 13/588,448, dated Oct. 4, 2012.

Examination Report issued Oct. 15, 2012 in corresponding Australian Patent Application No. 2010236985.

Office Action issued Jan. 22, 2013 in corresponding Canadian Patent Application No. 2758884.

Examination Report issued Apr. 15, 2013 in corresponding European Patent Application No. 10705741.6.

METHODS AND SYSTEMS FOR RECOVERING RHENIUM FROM A COPPER LEACH

CROSS-REFERENCE TO RELATED APPLICATIONS

This application is a continuation of and claims priority to U.S. patent application Ser. No. 13/588,448 filed Aug. 17, 2012, entitled "Methods and Systems for Recovering Rhenium from a Copper Leach," which is a divisional of and claims priority to U.S. patent application Ser. No. 12/424,863, filed Apr. 16, 2009 entitled "Methods and Systems for Recovering Rhenium from a Copper Leach," which are both hereby incorporated by reference in their entirety.

FIELD OF THE INVENTION

The present invention relates generally to the recovery of rhenium and relates more specifically to the recovery of rhenium from a copper leach.

BACKGROUND

Rhenium was the last naturally occurring element to be discovered and the last element discovered having a stable isotope. Rhenium is typically recovered as a byproduct of molybdenum refinement. Since recovery of rhenium from molybdenite is difficult and the concentrations of rhenium in molybdenite are very low, typically from about 0.002% to about 0.02%, rhenium is one of the most expensive metals available in commodity markets. Rhenium has several characteristics that make it unique, such as, for example, the second highest melting point amongst metals, amongst the densest metals, a super conductor, and the greatest number of oxidation states of any element. Industrial applications include the use of rhenium in catalysts, electronics, thermocouples, high temperature turbine blades, and photoflash devices.

Rhenium may be extracted from ores that contain copper and molybdenum. Common practice for leaching copper from low-grade copper ore is to place the ore in a heap leach pad and leach the ore with dilute sulfuric acid solution. The resulting copper-bearing solution is typically concentrated via solvent extraction and/or electrowon to produce pure copper cathode. Typically, the copper-bearing solution has less than one part per million of dissolved rhenium and may contain significant amounts of other metals in the copper-bearing solution. Recovery of rhenium from the copper-bearing solution is not economically feasible and hence rhenium is, along with other metal values, typically not recovered from the copper-bearing solution before the electrowinning stage.

Generally, rhenium is recovered as a result of the molybdenite roasting to produce molybdenum. The acid blow-down from the molybdenite roasting off-gas contains concentrations of rhenium which are much higher than the concentrations of rhenium in the copper-bearing solution. In addition, the acid blow-down stream does not contain the metal values such as copper or molybdenum since they have already been recovered upstream, and this allows rhenium to be recovered from the acid blow-down stream by ion exchange, solvent extraction and/or crystallization.

Since the demand for rhenium continues to increase on a year-by-year basis, new methods for rhenium recovery from sources other than molybdenum roasting processes are needed.

SUMMARY

In accordance with various embodiments, the present invention provides new methods of rhenium recovery. The methods can include subjecting a copper-bearing solution to an activated carbon bed, and adsorbing rhenium onto the activated carbon. The methods can also include heating a basic aqueous elution solution and eluting the rhenium from the activated carbon with the heated elution solution.

In addition, various embodiments of the present invention provide systems for the recovery of rhenium from copper leach heap. Systems can include an effluent entry in communication with at least one activated carbon bed and an effluent exit in communication with the activated carbon bed and distal to the effluent entry. In such systems, effluent entry can feed a copper-bearing solution comprising a rhenium metal value through the activated carbon bed while the effluent exit allows the remainder of the copper-bearing solution to exit the activated carbon bed after allowing the rhenium to adsorb onto the activated carbon. In an exemplary embodiment of the present invention, the at least one activated carbon bed can be a plurality of activated carbon beds connected to each other in series. Various embodiments of the systems can include an elution stream controllably in communication with the at least one bed of activated carbon. In an exemplary embodiment, the systems can include an eluate port controllably in communication with the bed of activated carbon and the eluate exit can be operable to remove a rhenium stream.

Further areas of applicability will become apparent from the description provided herein. It should be understood that the description and the specific examples are intended for purposes of illustration only, and are not intended to limit the scope of the present invention.

BRIEF DESCRIPTION OF THE DRAWINGS

The drawings described herein are for illustration purposes only and are not intended to limit the scope of the present disclosure in any way. The present invention will become more fully understood from the detailed description and the accompanying drawings wherein.

DETAILED DESCRIPTION

Figure 1:
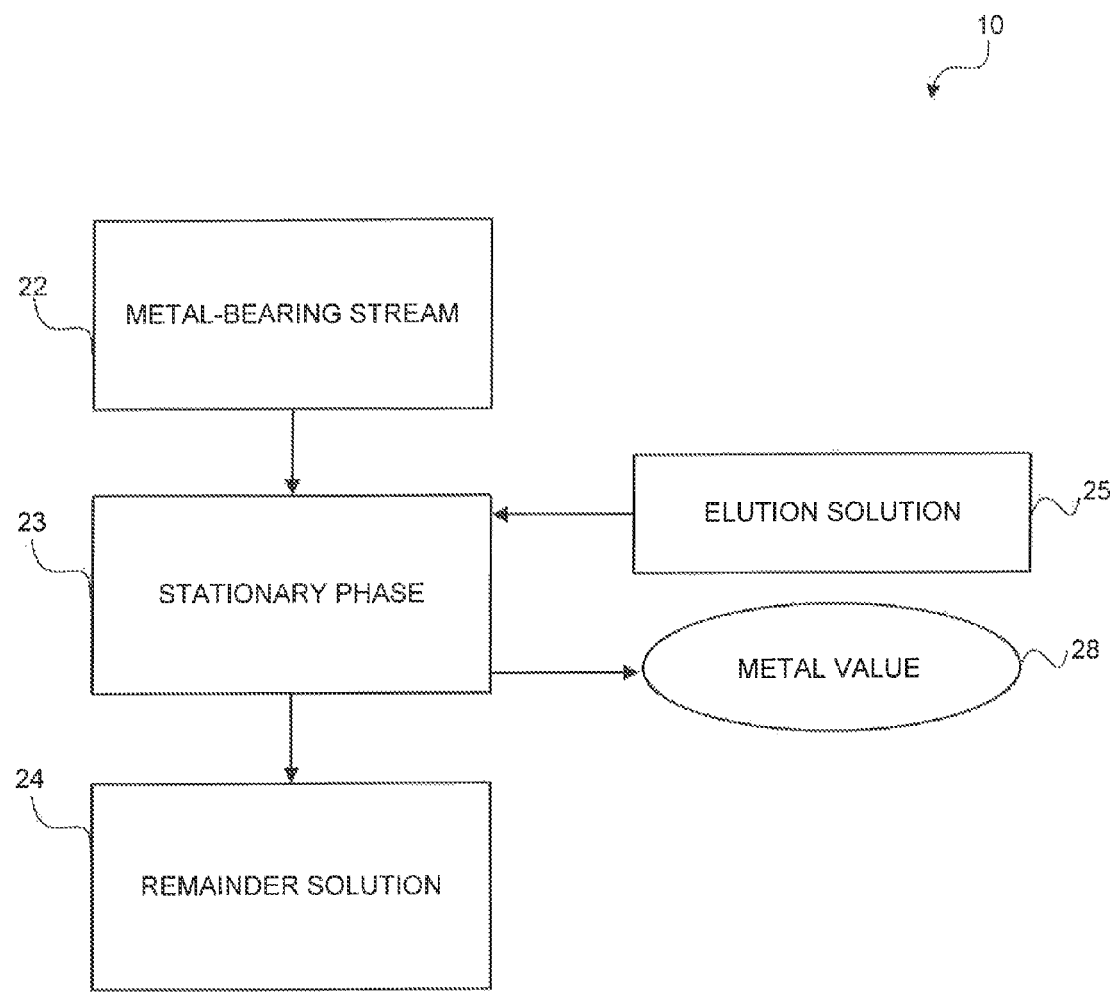
FIG. 1 is a block diagram illustrating a rhenium recovery process, according to various embodiments of the present invention.

The following description is merely exemplary in nature, and is not intended to limit the present invention, its applications, or its uses. It should be understood that throughout the drawings, corresponding reference numerals indicate like or corresponding parts and/or features. The descriptions' specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Various embodiments of the present invention are an improvement to the recovery of rhenium from ore bodies comprising copper and molybdenum. In various embodiments, rhenium can be recovered from a copper-bearing stream produced from copper leaching. Since the world demand for rhenium continues to increase, improvements are needed to recover rhenium from new sources. Since copper each solutions can comprise dissolved rhenium, the present invention provides methods and systems for the recovery of rhenium from such solutions.

With reference to FIG. 1, rhenium recovery process 10 is illustrated according to various embodiments of the present invention. Rhenium recovery process 10 can comprise metal-bearing stream 22, stationary phase 23, elution solution 25, and remainder solution 24. Metal-bearing stream 22 can comprise one or more metal values. In an exemplary embodiment, metal-bearing stream 22 comprises rhenium. In various embodiments, metal-bearing stream 22 can be a product resulting from a metal leaching process, such as, for example, a pregnant leach solution. Generally, metal-bearing stream 22 can be acidic, and may comprise sulfuric acid. In some aspects of the present invention, metal-bearing stream 22 can be a product of a solvent extraction process following a metal leaching process, such as, for example, a raffinate solution. In other aspect the metal-bearing stream 22 can be the product of leaching prior to solvent extraction, such as, for example, a pregnant leach solution. In other aspects of the present invention, metal-bearing solution can be a solution exiting from an electrowinning apparatus, such as, for example, lean electrolyte.

In various embodiments, stationary phase 23 can be any material, which can operably adsorb rhenium. In general, any porous material exhibiting adsorption properties due to high surface area is suitable. In an exemplary embodiment, stationary phase 23 can comprise carbon, such as, for example, activated carbon, activated charcoal, and/or activated coal. Another example of carbon useful for stationary phase 23 includes a coconut shell activated carbon having a U.S. sieve mesh size of 6×12. Any type or size of activated carbon, such as powder, particle, or granular sizes may be used in the present invention. The size of the activated carbon, typically measured in mesh size, can be determined by such factors as metal-bearing stream flow rate, activated carbon bed volume, adsorption capacity, and the like.

In various embodiments, stationary phase 23 can be static or fluidized. In an aspect of the invention, stationary phase 23 can be fluidized in the flow of metal-bearing stream 22. The fluidized stationary phase 23 can be collected in a down stream process, such as, for example, use of a screen or a sieve. The collected stationary phase 23 can then be subjected to elution solution 25 for recovery of metal value 28. In another aspect of the invention, stationary phase 23 can be static in a column with a mobile phase, such as metal-bearing stream 22, passing over stationary phase 23 and adsorbing metal value 28 onto stationary phase 23. Stationary phase 23 containing adsorbed metal value 28 can be subjected to elution solution 25 for recovery of metal value 28.

In various embodiments, remainder solution 24 can comprise metal-bearing stream 22 less material adsorbed on stationary phase 23. In an exemplary embodiment, remainder solution 24 comprises at least 80% less rhenium than metal-bearing stream 22, and preferably at least 90% less rhenium, and more preferably at least 95% less rhenium. In an aspect of the present invention, remainder solution 24 can be further processed to recover at least one metal value. In an exemplary embodiment, the at least one metal value is at least one of copper and molybdenum. In another aspect of the present invention, remainder solution 24 can be cycled for its acid content to any other process in a metal recovery system, such as, for example, a leaching process, a conditioning process, and/or a solvent extraction process.

In various embodiments, elution solution 25 can comprise any eluate, which can extract metal value 28 off of stationary phase 23. In general, elution solution 25 can be an aqueous solution having a pH greater than about 7. In an exemplary embodiment, elution solution 25 can comprise a hydroxide salt in an aqueous solution. For example, a hydroxide salt can be at least one of sodium hydroxide, ammonium hydroxide, lithium hydroxide, and potassium hydroxide. In an exemplary embodiment, elution solution 25 can be an aqueous solution comprising sodium hydroxide in an amount from about 0.1% to about 10% or preferably an amount from about 0.2% to about 5%, or more preferably an amount from about 0.5% to about 2.5%. In another exemplary embodiment, elution solution 25 can be an aqueous solution comprising ammonium hydroxide in an amount from about 0.1% to about 10% or preferably an amount from about 0.2% to about 5%, or more preferably an amount from about 0.5% to about 2.5%.

With continued reference to FIG. 1, in various embodiments, elution solution 25 can be heated to a temperature greater than or equal to 80° C. In an exemplary embodiment, elution solution 25 can be heated to a temperature from about 80° C. to about 130° C., and preferably to a temperature from about 90° C. to about 120° C., and more preferably to a temperature from about 105° C. to about 115° C., and even more preferably to a temperature from about 108° C. to about 110° C. In an aspect of the invention, as the temperature of elution solution 25 is increased, the amount of the hydroxide salt in the aqueous solution can be decreased. As the temperature of elution solution 25 is increased, the elution efficiency increases. In addition, as the temperature of elution solution 25 is increased, the costs of elution solution 25 decrease.

In various embodiments, a method for recovering rhenium can comprise passing metal-bearing stream 22 through stationary phase 23 and adsorbing a metal value on stationary phase 23. The method can comprise removing remainder solution 24 from stationary phase 23. The method can further comprise recovering a second metal value from remainder solution 24. The method can comprise stopping the metal-bearing stream 22 and eluting metal value 28 from stationary phase 23. The method can further comprise heating elution solution 25 then eluting metal value 28 from stationary phase 23. In an exemplary embodiment, metal value 28 is rhenium.

Figure 2:
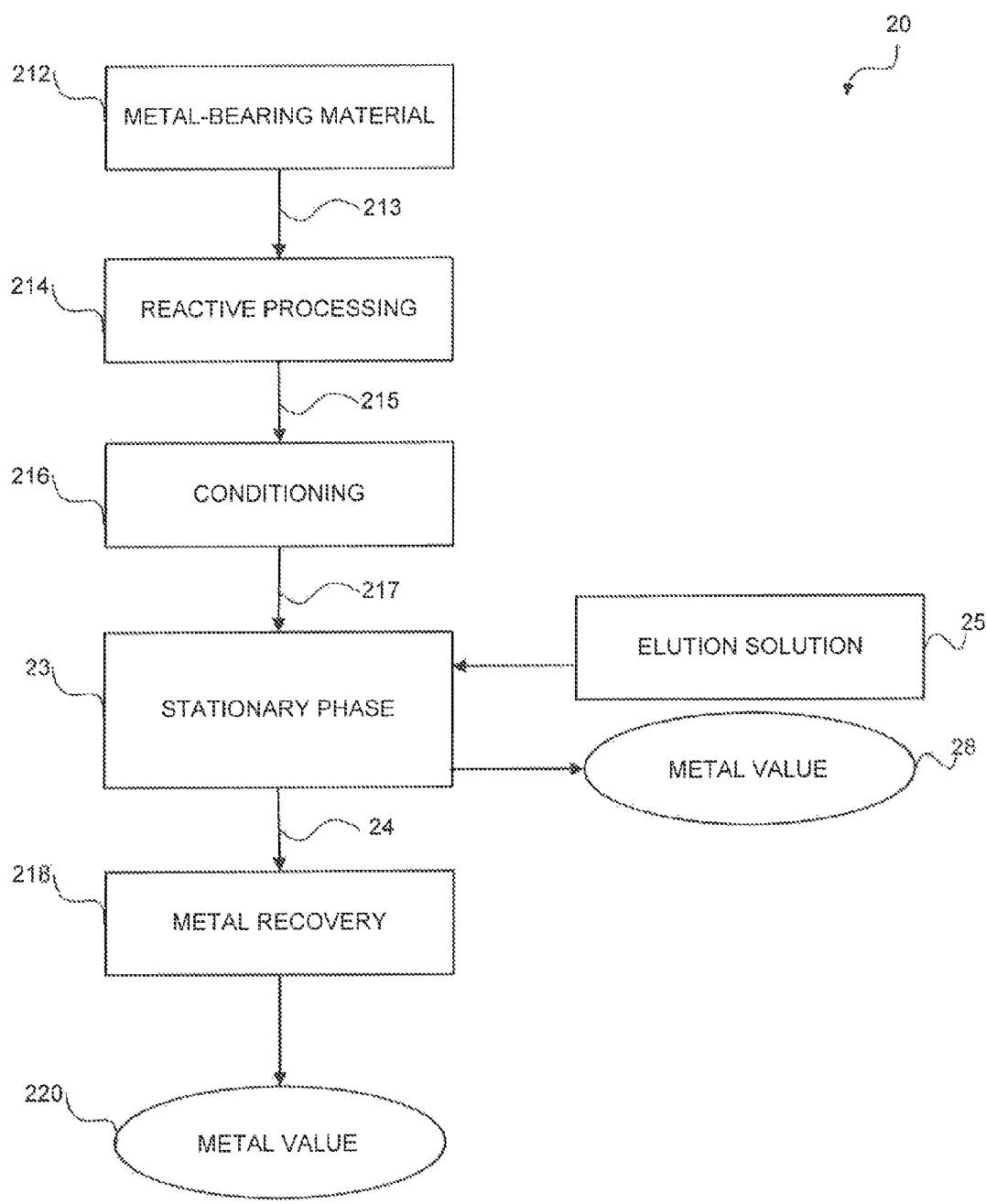
FIG. 2 is a block diagram illustrating a rhenium recovery system, according to various embodiments of the present invention.

Now referring to FIG. 2, rhenium recovery system 20 is illustrated according to various embodiments of the present invention. Metal-bearing material 212 may be an ore, a concentrate, or any other material from which metal values may be recovered. Metal values such as, for example, copper, gold, silver, zinc, platinum group metals, nickel, cobalt, molybdenum, rhenium, uranium, rare earth metals, and the like may be recovered from metal-bearing material 212 in accordance with various embodiments of the present invention. Various aspects and embodiments of the present invention, however, prove especially advantageous in connection with the recovery of copper from copper sulfide concentrates and/or ores, such as, for example, chalcopyrite ($CuFeS_2$), chalcocite ($Cu_2S$), bornite ($Cu_5FeS$), covellite ($CuS$), enargite ($Cu_3AsS_4$), digenite ($Cu_9S_5$), and/or mixtures thereof. Thus, in various embodiments, metal-bearing material 212 is a copper ore or concentrate, and in an exemplary embodiment, metal-bearing material 212 is a copper sulfide ore or concentrate.

In various embodiments, processed metal-bearing material 213 may comprise metal-bearing material 212 prepared for metal recovery process 20 in any manner that enables the conditions of processed metal-bearing material 213 to be suitable for a chosen processing method, as such conditions may affect the overall effectiveness and efficiency of processing operations. Desired composition and component concentration parameters may be achieved through a variety of chemical and/or physical processing stages, the choice of which will depend upon the operating parameters of the chosen processing scheme, equipment cost and material specifications. For example, metal-bearing material 212 may undergo comminution, flotation, blending, and/or slurry formation, as well as chemical and/or physical conditioning to produce processed metal-bearing material 213. In an exemplary embodiment, processed metal-bearing material 213 is a concentrate.

With continued reference to FIG. 2, after metal-bearing material 212 has been suitably prepared, processed metal-bearing material 213 is subjected to reactive processing 214 to put a metal value or metal values in processed metal-bearing material 213 in a condition for later metal recovery steps, namely metal recovery 218. For example, exemplary suitable processes include reactive processes that tend to liberate the desired metal value or metal values from the metal-bearing material 212. In accordance with an exemplary embodiment of the present invention, reactive processing 214 may comprise leaching. Leaching can be any method, process, or system that enables a metal value to be leached from processed metal-bearing material 213. Typically, leaching utilizes acid to each a metal value from processed metal-bearing material 213. For example, leaching can employ a leaching apparatus, such as, for example, a heap leach, a vat leach, a tank leach, a pad leach, a leach vessel or any other leaching technology useful for leaching a metal value from processed metal-bearing material 213.

In accordance with various embodiments, leaching may be conducted at any suitable pressure, temperature, and/or oxygen content. Leaching can employ one of a high temperature, a medium temperature, or a low temperature, combined with one of high pressure, or atmospheric pressure. Leaching may utilize conventional atmospheric or pressure leaching, for example, but not limited to, low, medium or high temperature pressure leaching. As used herein, the term "pressure leaching" refers to a metal recovery process in which material is contacted with an acidic solution and oxygen under conditions of elevated temperature and pressure. Medium or high temperature pressure leaching processes for chalcopyrite are generally thought of as those processes operating at temperatures from about 120° C. to about 190° C. or up to about 250° C. In accordance with various embodiments of the present invention, reactive processing 214 may comprise any type of reactive process to put a metal value or values in processed metal-bearing material 213 in a condition to be subjected to later metal recovery steps.

In various embodiments, reactive processing 214 provides a metal-bearing slurry 215 for conditioning 216. In various embodiments, conditioning 216 can be, for example, but is not limited to, a solid liquid phase separation step, an additional each step, a pH adjustment step, a dilution step, a concentration step, a metal precipitation step, a filtering step, a settling step, and the like, as well as combinations thereof. In an exemplary embodiment, conditioning 216 can be a solid liquid phase separation step configured to yield a metal-bearing solution 217 and a metal-bearing solid.

In other various embodiments, conditioning 216 may be one or more leaching steps. For example, conditioning 216 may be any method, process, or system that further prepares metal-bearing material 212 for recovery. In various embodiments, conditioning 216 utilizes acid to leach a metal value from a metal-bearing material. For example, conditioning 216 may employ a leaching apparatus such as, for example, a heap leach, a vat leach, a tank leach, a pad leach, a leach vessel or any other leaching technology useful for leaching a metal value from a metal-bearing material.

In accordance with various embodiments, conditioning 216 may be a leach process conducted at any suitable pressure, temperature, and/or oxygen content. In such embodiments, conditioning 216 may employ one of a high temperature, a medium temperature, or a low temperature, combined with one of high pressure, or atmospheric pressure. Conditioning 216 may utilize conventional atmospheric or pressure leaching, for example, but not limited to, low, medium or high temperature pressure leaching. Medium or high temperature pressure leaching processes for chalcopyrite are generally thought of as those processes operating at temperatures from about 120° to about 190° C. or up to about 250° C.

In various embodiments, conditioning 216 may comprise dilution, settling, filtration, solution/solvent extraction, ion exchange, pH adjustment, chemical adjustment, purification, concentration, screening, and size separation. In various embodiments, conditioning 216 is a high temperature, high pressure leach. In other embodiments, conditioning 216 is an atmospheric leach. In further embodiments, conditioning 216 is a solid liquid phase separation. In still further embodiments, conditioning 216 is a settling/filtration step. In various embodiments, conditioning 216 produces metal-bearing solution 217.

With further reference to FIG. 2, in various embodiments, metal-bearing solution 217 may be passed through stationary phase 23. As described above, metal value 28 can be adsorbed onto stationary phase 23. A remainder solution 24 can be removed from stationary phase 23. Metal value 28 can be eluted off stationary phase 23 with elution solution 25. Elution solution 25 can be heated as described herein. In a preferable embodiment, metal value 28 is rhenium.

In an exemplary embodiment, stationary phase 23 can be combined with metal-bearing solution 217 to create a slurry. In this exemplary embodiment, stationary phase 23 is fluidized in the slurry. A course carbon powder can be advantageous for use as stationary phase 23. Metal value 28 can be adsorbed on to stationary phase 23. Fluidized stationary phase 23 can be collected by use of a screen or a sieve. Metal value 28 can be eluted off stationary phase 23 with elution solution 25 as described herein.

In various embodiments, remainder solution 24 may be subjected to metal recovery 218 to yield metal value 220. In exemplary embodiments, metal recovery 218 can comprise electrowinning remainder solution 24 to yield recovered metal value 220 as a cathode. In one exemplary embodiment, metal recovery 218 may be configured to employ conventional electrowinning processes and include a solvent extraction step, an ion exchange step, an ion selective membrane, a solution recirculation step, and/or a concentration step. In one preferred embodiment, metal recovery 218 may be configured to subject remainder solution 24 to a solvent extraction step to yield a rich electrolyte solution, which may be subject to an electrowinning circuit to recover a desired metal value 220. In another exemplary embodiment, metal recovery 218 may be configured to employ direct electrowinning processes without the use of a solvent extraction step, an ion exchange step, an ion selective membrane, a solution recirculation step, and/or a concentration step. In another preferred embodiment, metal recovery 218 may be configured to feed remainder solution 24 directly into an electrowinning circuit to recover a desired metal value 220. In an especially preferred embodiment, metal value 220 is copper.

Figure 3:
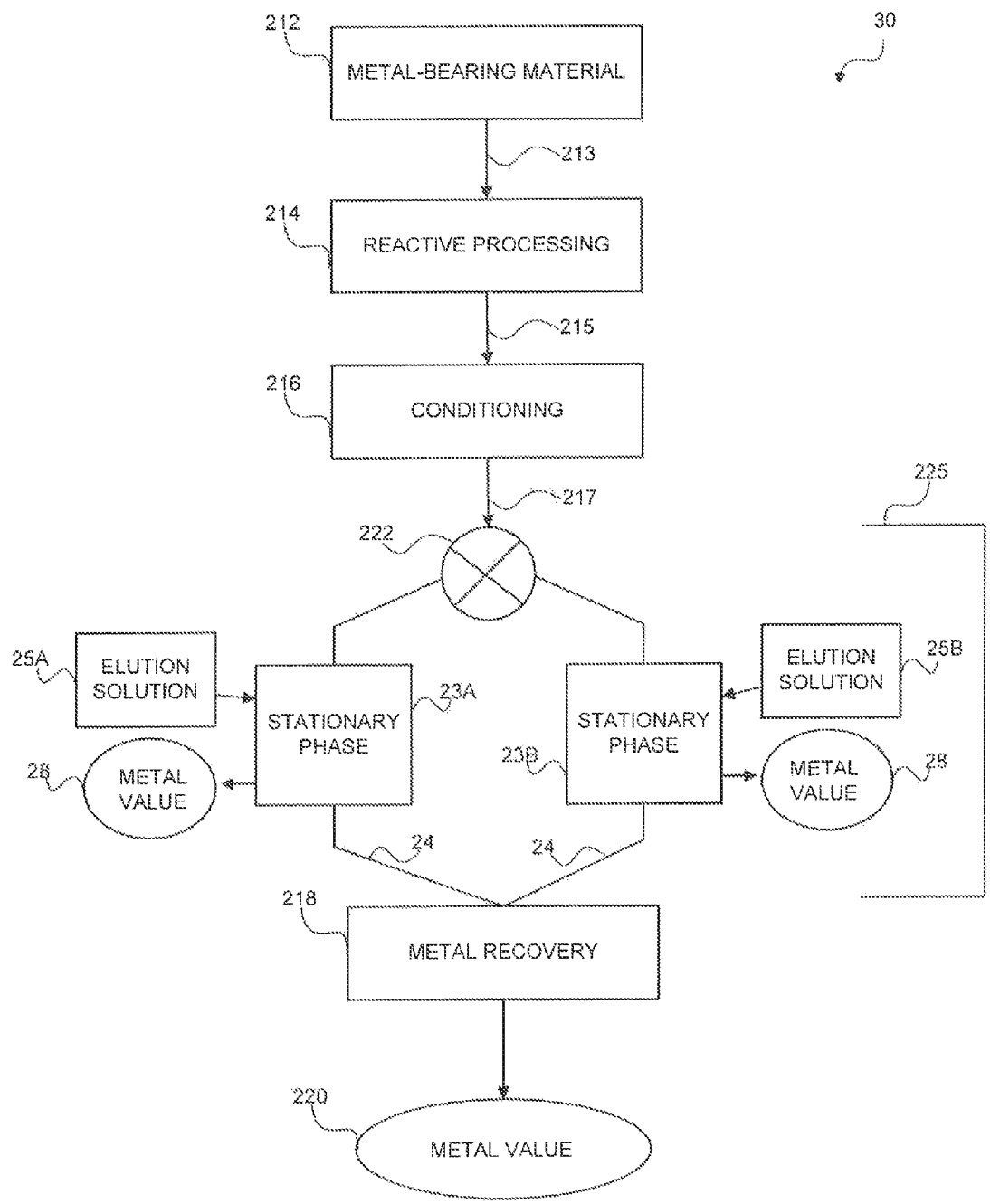
FIG. 3 is a block diagram illustrating a first exemplary process for recovering rhenium and a second metal value from a metal-bearing material, according to various embodiments of the present invention.

Turning to FIG. 3, a first exemplary process 30 for recovering rhenium and a second metal value from a metal-bearing material 212 is illustrated according to various embodiments of the present invention. After metal-bearing material 212 has been suitably prepared, processed metal-bearing material 213 is subjected to reactive processing 214 to put a metal value or metal values in processed metal-bearing material 213 in a condition for later metal recovery steps, namely first metal recovery 225 and second metal recovery 218. In accordance with an exemplary embodiment of the present invention, reactive processing 214 comprises a leaching process.

In various embodiments, reactive processing 214 provides metal-bearing slurry 215 for conditioning 216. In an exemplary embodiment, conditioning 216 can be a solid liquid phase separation step configured to yield metal-bearing solution 217 and a metal-bearing solid. In various embodiments, metal-bearing solution 217 is subjected to first metal recovery 225 to recover first metal value 28. First metal recovery 225 comprises valve 222 in communication with conditioning 216, and first stationary phase 23A and second stationary phase 238 connected in parallel with valve 222. Valve 222 can control flow of metal-bearing solution 217 to either first stationary phase 23A or second stationary phase 23B. In various embodiments, metal-bearing solution 217 passes through a first stationary phase 23A until first stationary phase 23A is loaded with metal value 28 to near capacity. Then valve 222 switches the flow of metal-bearing solution 217 to pass through second stationary phase 23B. After valve 222 switches, elution solution 25A can be passed through stationary phase 23A to elute metal value 28. When second stationary phase 23B is loaded with metal value 28 to near capacity, valve 222 switches flow of metal-bearing solution 217 back to stationary phase 23A. After valve 222 switches the second time, elution solution 25B can be passed through stationary phase 23B to elute metal value 28.

In various embodiments, remainder solution 24 may be subjected to metal recovery 218 to yield metal value 220. In exemplary embodiments, metal recovery 218 can comprise electrowinning remainder solution 24 to yield recovered metal value 220 as a cathode. In a preferred embodiment, metal recovery 218 may be configured to feed remainder solution 24 directly into an electrowinning circuit to recover a desired metal value 220. In an especially preferred embodiment, metal value 220 is copper.

Figure 4:
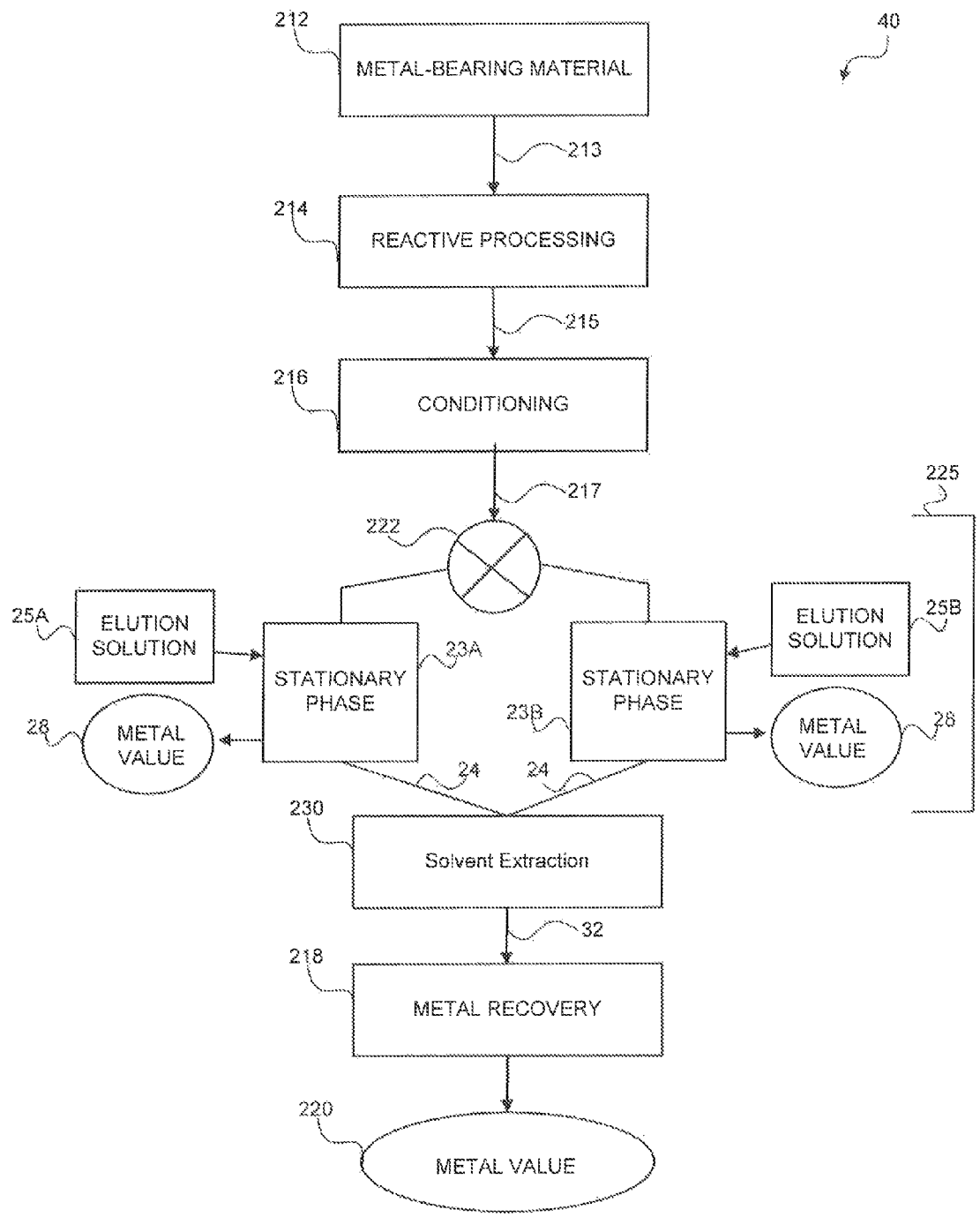
FIG. 4 is a block diagram illustrating a second exemplary process for recovering rhenium and a second metal value from a metal-bearing material, according to various embodiments of the present invention.

Moving to FIG. 4, a second exemplary process 40 for recovering rhenium and a second metal value from a metal-bearing material 212 is illustrated according to various embodiments of the present invention. After metal-bearing material 212 has been suitably prepared, processed metal-bearing material 213 is subjected to reactive processing 214 to put a metal value or metal values in processed metal-bearing material 213 in a condition for later metal recovery steps, namely first metal recovery 225 and second metal recovery 218. In accordance with an exemplary embodiment of the present invention, reactive processing 214 comprises a leaching process.

In various embodiments, reactive processing 214 provides metal-bearing slurry 215 for conditioning 216. In an exemplary embodiment, conditioning 216 can be a solid liquid phase separation step configured to yield metal-bearing solution 217 and a metal-bearing solid. In various embodiments, metal-bearing solution 217 is subjected to first metal recovery 225 to recover first metal value 28. First metal recovery 225 comprises valve 222 in communication with conditioning 216, and first stationary phase 23A and second stationary phase 23B connected in parallel with valve 222. Valve 222 can control flow of metal-bearing solution 217 to either first stationary phase 23A or second stationary phase 23B. In various embodiments, metal-bearing solution 217 passes through a first stationary phase 23A until first stationary phase 23A is loaded with metal value 28 to near capacity. Then valve 222 switches the flow of metal-bearing solution 217 to pass through second stationary phase 23B. After valve 222 switches, elution solution 25A can be passed through stationary phase 23A to elute metal value 28. When second stationary phase 23B is loaded with metal value 28 to near capacity, valve 222 switches flow of metal-bearing solution 217 back to stationary phase 23A. After the valve 222 switches the second time, elution solution 258 can be passed through stationary phase 238 to elute metal value 28.

In various embodiments, remainder solution 24 can be subjected to solvent extraction 230. In accordance with various aspects of this embodiment of the present invention, solvent extraction 230 can be configured to selectively extract a metal value, such as, for example copper. During solvent extraction 230, a metal value, such as, for example copper, from metal-bearing solution may be loaded selectively onto an organic chelating agent, for example, an aldoxime/ketoxime blend, resulting in a metal value containing organic stream and a raffinate solution. In various embodiments, the metal value containing organic stream may comprise a copper compound. Solvent extraction 230 can be configured to select for a metal value, such as copper by the selection of an appropriate mixture of ketoximes and/or aldoximes. Solvent extraction 230 can produce a raffinate solution and a rich electrolyte 32. In various embodiments, solvent extraction 230 can yield a rich electrolyte 32 comprising a metal value.

Raffinate from solvent extraction 230 advantageously may be used in a number of ways. For example, all or a portion of raffinate may be recycled to reactive processing 214, such as, for example to aid with temperature control or solution balancing, or it may be used in other leaching operations, or it may be used for any combination thereof. The use of raffinate in reactive processing 214 may be beneficial because the acid values contained in raffinate may act to optimize the potential for leaching oxide and/or sulfide ores that commonly dominate heap leaching operations. It should be appreciated that the properties of raffinate, such as component concentrations, may be adjusted in accordance with the desired use of raffinate.

In various embodiments, rich electrolyte 32 may be subjected to metal recovery 218 to yield metal value 220. In exemplary embodiments, metal recovery 218 can comprise electrowinning rich electrolyte 32 to yield recovered metal value 220 as a cathode. In a preferred embodiment, metal recovery 218 may be configured to feed rich electrolyte 32 directly into an electrowinning circuit to recover a desired metal value 220. In an especially preferred embodiment, metal value 220 is copper.

Figure 5:
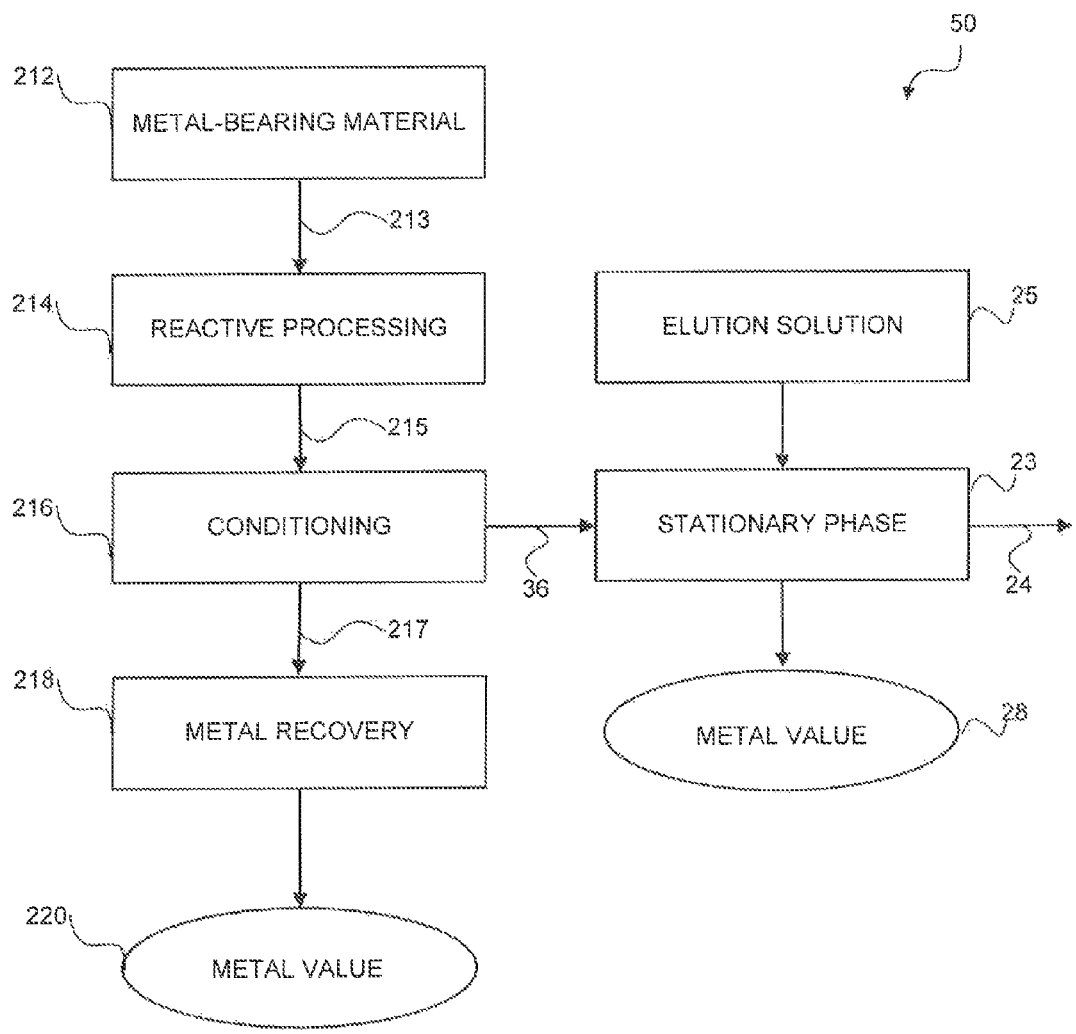
FIG. 5 is a block diagram illustrating a third exemplary process for recovering rhenium and a second metal value from a metal-bearing material, according to various embodiments of the present invention.

With reference to FIG. 5, a third exemplary process 50 for recovering rhenium and a second metal value from a metal-bearing material 212 is illustrated according to various embodiments of the present invention. After metal-bearing material 212 has been suitably prepared, processed metal-bearing material 213 is subjected to reactive processing 214 to put a metal value or metal values in processed metal-bearing material 213 in a condition for later metal recovery 218. In accordance with an exemplary embodiment of the present invention, reactive processing 214 comprises a leaching process. In various embodiments, reactive processing 214 provides metal-bearing slurry 215 for conditioning 216.

With further reference to FIG. 5, in various embodiments, metal-raffinate 36 may be passed through stationary phase 23. As described above, metal value 28 can be adsorbed onto stationary phase 23. A remainder solution 24 can be removed from stationary phase 23. Metal value 28 can be eluted off stationary phase 23 with elution solution 25. Elution solution 25 can be heated as described above. In a preferable embodiment, metal value 28 is rhenium.

Figure 6:
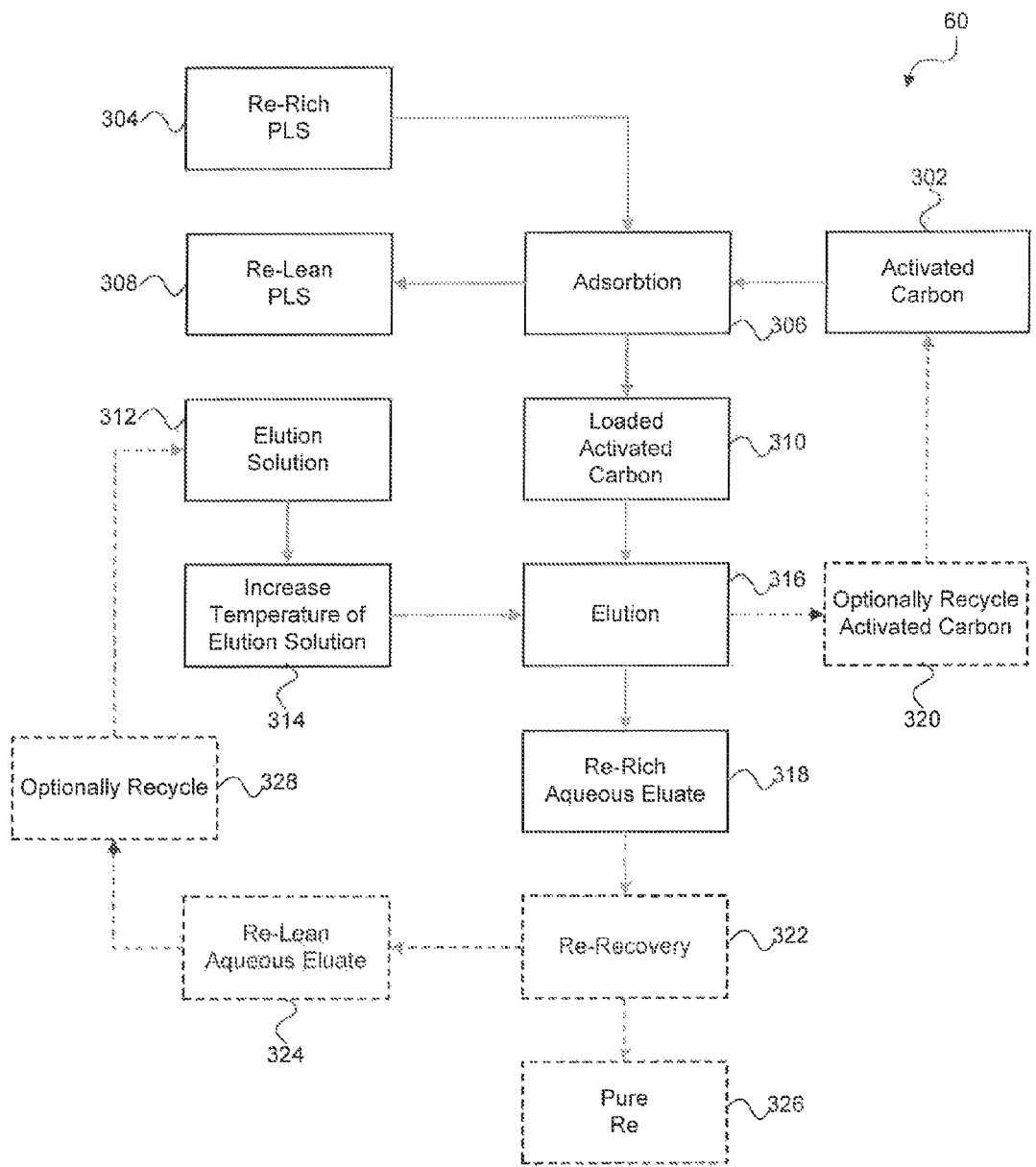
FIG. 6 is a block diagram illustrating a method for recovering rhenium according to various embodiments of the present invention.

With reference to FIG. 6, an exemplary method 60 for recovery of rhenium is illustrated according to various embodiments of the present invention. A column comprising a stationary phase, such as activated carbon 302, can be placed in communication with a rhenium-rich pregnant leach solution 304 ("Re-rich PLS 304"). In an exemplary embodiment, Re-rich PLS 304 can comprise rhenium and copper. Re-rich PLS 304 can originate from an active copper leach or a stockpile copper leach, for example, residing in a pond or a pit. In an exemplary embodiment, Re-rich PLS 304 can be an acid blow-down stream or leach of molybdenite roaster flue fumes and dusts. In another exemplary embodiment, Re-rich PLS 304 can be a raffinate stream. One skilled in the art will appreciate that any solution comprising rhenium, in any concentration, is suitable for use herewith, For example, solutions containing more or less than 1 mg/L rhenium, even in the presence of iron, copper, molybdenum, vanadium and other metals, are suitable for use herewith. One skilled in the art will further appreciate that flow through a plurality of columns, in series, in parallel, or in any other arrangement, is within the scope of this disclosure.

Rhenium can be adsorbed 306 onto activated carbon 302 of the column and a rhenium-lean pregnant leach solution 308 can exit from the column. The rhenium-loaded column 310 can be placed in communication with elution solution 312. Elution solution 312 can be heated 314 to a temperature. In various embodiments, elution solution 312 can comprise any eluate, which can extract rhenium off of the loaded column 310. In general, elution solution 312 can be an aqueous solution having a pH greater than about 7.

In an exemplary embodiment, elution solution 312 can comprise a hydroxide salt in an aqueous solution. For example, a hydroxide salt can be at least one of sodium hydroxide, ammonium hydroxide, lithium hydroxide, and potassium hydroxide. In an exemplary embodiment, elution solution 312 can be an aqueous solution comprising sodium hydroxide in an amount from about 0.1% to about 10% or preferably an amount from about 0.2% to about 5%, or more preferably an amount from about 0.5% to about 2.5%. In another exemplary embodiment, elution solution 312 can be an aqueous solution comprising ammonium hydroxide in an amount from about 0.1% to about 10% or preferably an amount from about 02% to about 5%, or more preferably an amount from about 0.5% to about 2.5%.

In various embodiments, elution solution 312 can be heated 314 to a temperature greater than or equal to 80° C. In an exemplary embodiment, elution solution 312 can be heated 314 to a temperature from about 80° C. to about 130° C., and preferably to a temperature from about 90° C. to about 120° C., and more preferably to a temperature from about 105° C. to about 115° C., and even more preferably to a temperature from about 108° C. to about 110° C. In an aspect of the invention, as the temperature of elution solution 312 is increased 314, the amount of the hydroxide salt in the aqueous solution can be decreased. As the temperature of elution solution 312 is increased 314, the elution efficiency increases. In addition, as the temperature of elution solution 312 is increased 314, the costs of the elution solution 312 decrease.

In various embodiments, rhenium can be eluted 316 from rhenium-loaded column 310 to produce Re-rich aqueous eluate 318. Optionally, the stationary phase of the column can be regenerated 320 and recycled as activated carbon 302. Optionally, Re-rich eluate 318 can be subjected to a rhenium recovery 322 to produce pure rhenium 326 and Re-lean aqueous eluate 324. Optionally Re-lean eluate 324 can be recycled 328 to elution solution 312.

Figure 7:
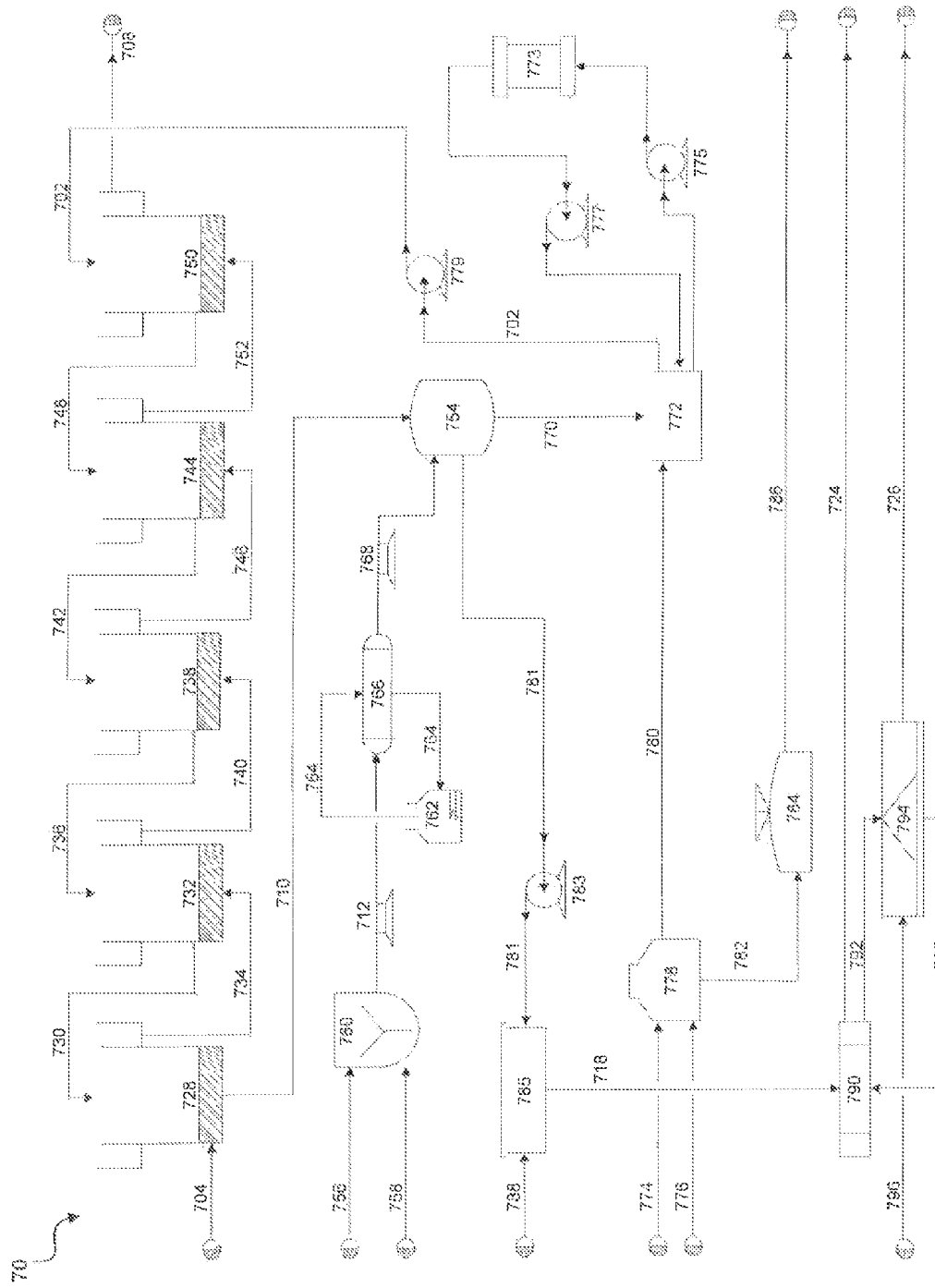
FIG. 7 is a flow diagram further illustrating a plant scale process for recovering rhenium, according to various embodiments of the present invention.

Finally turning to FIG. 7, plant scale process 70 for recovering rhenium is illustrated according to various embodiments of the present invention. According to plant scale process 70, rhenium rich PLS 704 flows into a first adsorption column 728 containing first partially loaded carbon 730 from second adsorption column 732. Any suitable adsorption column may be used with the present invention, for example, a twelve-foot diameter by twelve-foot high adsorption column.

First partially adsorbed rhenium PLS 734 flows from first adsorption column 728 into second adsorption column 732 containing second partially loaded carbon 736 from third adsorption column 738. The amount of rhenium adsorbed onto second partially loaded carbon 736 can be less than that adsorbed onto first partially loaded carbon 730.

Second partially adsorbed rhenium PLS 740 flows from second adsorption column 732 into third adsorption column 738 containing a third partially loaded carbon 742 from a fourth adsorption column 744. The amount of rhenium adsorbed onto third partially loaded carbon 742 is less than that adsorbed onto second partially loaded carbon 736.

Third partially adsorbed rhenium PLS 746 flows from third adsorption column 738 into fourth adsorption column 744 containing fourth partially loaded carbon 748 from fifth adsorption column 750. The amount of rhenium adsorbed onto fourth partially loaded carbon 748 is less than that adsorbed onto third partially loaded carbon 742.

Fourth partially adsorbed rhenium PLS 752 flows from fourth adsorption column 744 into fifth adsorption column 750 containing stripped activated carbon 702. Rhenium lean PLS 708 flows away, for example, for other metal recovery. Loaded activated carbon 710 from first adsorption column 728 flows to an elution vessel 754. Any suitable elution vessel may be used with the present invention, for example, one or a plurality of 2600 gallon elution vessels. One skilled in the art will appreciate that flow through any number of columns, in series, in parallel, or in any other arrangement, is within the scope of this disclosure.

Water 756 and eluate 758 are mixed in mix tank 760 to yield an elution solution 712. In an exemplary embodiment, elution solution 712 comprises one or more of sodium hydroxide, ammonium hydroxide, lithium hydroxide, and potassium hydroxide. Boiler 762 heats water 764 recycled through a plate heat exchanger 766. One or a plurality of heat exchanges can be used. Plate heat exchanger 766 in turn heats elution solution 712 to yield heated elution solution 768, which flows to elution vessel 754. In an exemplary embodiment, the temperature of elution solution 712 is increased, for example, to about 100° C. to about 140° C., or to about 100° C. to about 120° C., or to about 100° C.-110° C.

Spent carbon 770 flows from elution vessel 754 to carbon pre-treatment tank 772. New carbon 774 is washed with water 776 in wash tank 778 to yield washed carbon 780, which also flows to carbon pre-treatment tank 772. Wash 782 with reject fine carbon flows to a carbon super sack 784. Carbon super sack 784 can be drained of excess water 786. Carbon in carbon pre-treatment tank 772 flows through carbon rotary kiln 773 for re-activation of carbon via pumps 775 and 777. In an exemplary embodiment, carbon rotary kiln 773 is rated at 200 lb/hour. Stripped activated carbon 702 then flows into fifth adsorption column 750 via pump 779.

A rhenium eluate 781 flows from elution vessel 754, via pump 783, to eluate tank 785, where it is mixed with aqueous solution 788. Any suitable eluate tank may be used with the present invention, for example, one or a plurality of 15000 gallon eluate tanks. In an exemplary embodiment, aqueous solution 788 is sulfuric acid. A resulting rhenium rich aqueous eluate 718 flows to a solvent extraction (SX) process tank 790. Any suitable SX process tank 790 may be used with the present invention, for example, one or a plurality of 1000 gallon SX process tanks.

Rich organic 792 flows to a solvent extraction stripper 794, where it is stripped with a striping solution 796. In an exemplary embodiment, solvent extraction stripper 794 is rated at 20 gal/minute. In an exemplary embodiment, stripping solution 796 is sodium hydroxide. Lean organic 798 returns to SX process tank 790. A resulting rhenium lean aqueous eluate 724 flows to a raffinate pond or is recycled and reused. Concentrated rhenium 726 is available for storage and use.

Example 1

A stationary phase comprising activated carbon was loaded with rhenium. Three aqueous elution solutions comprised ammonium hydroxide in varying concentrations can be prepared (see Table 1). Ammonium hydroxide was formed by adding ammonia to water. Each elution solution was heated to a temperature of about 108° C. to about 110° C. and passed through the stationary phase at a rate of about 1.5 bed volumes per hour to about 2.0 bed volumes per hour. The complete elution cycle was about 4 bed volumes to about 6 bed volumes. Rhenium can be recovered through the elution and results are shown in Table 1.

TABLE 1

Rhenium Yields at varying Concentrations of Ammonia

| Eluate | Conc. % | Re Yield, % |
|---|---|---|
| $NH_3$ | 0.5 | 95.2 |
| $NH_3$ | 1.0 | 95.9 |
| $NH_3$ | 2.5 | 96.1 |

Example 2

A stationary phase comprising activated carbon was loaded with rhenium. Eight aqueous elution solutions comprised ammonium hydroxide in varying concentrations can be prepared (see Table 2). Ammonium hydroxide was formed by adding ammonia to water. Each elution solution was heated to a temperature (see Table 2) and passed through the stationary phase at a rate of about 1.5 bed volumes per hour to about 2.0 bed volumes per hour. The complete elution cycle was an average of about 16 bed volumes. Rhenium was recovered through the elution and results are shown in Table 2.

TABLE 2

Rhenium Yields at varying Concentrations of Ammonia

| Eluate | Conc. % | Temp, ° C. | Re Yield, % |
|---|---|---|---|
| $NH_3$ | 15 | 22 | 80.8 |
| $NH_3$ | 15 | 50 | 92.0 |
| $NH_3$ | 15 | 80 | 91.4 |
| $NH_3$ | 29 | 22 | 88.1 |
| $NH_3$ | 5 | 50 | 88.0 |
| $NH_3$ | 5 | 75 | 93.3 |
| $NH_3$ | 5 | 50 | 87.2 |
| $NH_3$ | 5 | 50 | 89.4 |

Example 3

A stationary phase comprising activated carbon was loaded with rhenium. Three aqueous elution solutions comprised sodium hydroxide in varying concentrations can be prepared (see Table 3). Each elution solution was heated to a temperature of about 108° C. to about 110° C. and passed through the stationary phase at a rate of about 1.5 bed volumes per hour to about 2.0 bed volumes per hour. The complete elution cycle was about 6 bed volumes to about 8 bed volumes. Rhenium was recovered through the elution and results are shown in Table 3.

TABLE 3

Rhenium Yields at varying Concentrations of Sodium Hydroxide

| Eluate | Conc. % | Re Yield, % |
|---|---|---|
| NaOH | 1.0 | 98.6 |
| NaOH | 2.0 | 97.1 |
| NaOH | 5.0 | 96.9 |

Example 4

A stationary phase comprising activated carbon was loaded with rhenium. Eight aqueous elution solutions comprised sodium hydroxide in varying concentrations can be prepared (see Table 4). Each elution solution was heated to a temperature (see Table 4) and passed through the stationary phase at a rate of about 1.5 bed volumes per hour to about 2.0 bed volumes per hour. The complete elution cycle was an average of 16 bed volumes. Rhenium was recovered through the elution and results are shown in Table 4.

TABLE 4

Rhenium Yields at varying Concentrations of Sodium Hydroxide

| Eluate | Conc. % | Temp, ° C. | Re Yield, % |
|---|---|---|---|
| NaOH | 15 | 22 | 59.0 |
| NaOH | 15 | 50 | 88.3 |
| NaOH | 15 | 80 | 93.6 |
| NaOH | 40 | 23 | 69.9 |
| NaOH | 40 | 50 | 85.3 |
| NaOH | 40 | 50 | 79.6 |
| NaOH | 40 | 50 | 84.7 |
| NaOH | 40 | 80 | 89.0 |

Example 5

A copper heap each solution was contacted with four columns in series containing a stationary phase comprising activated carbon. The copper leach solution contains 0.65 mg/L of dissolved rhenium. Other metals, such as aluminum, cadmium, calcium, cobalt, copper, iron, magnesium, manganese, sodium, nickel, silicon, vanadium, yttrium and zinc, were present in the copper leach solution at concentrations greater than the concentration of dissolved rhenium. The copper leach solution was contacted with the stationary phase at a rate of 0.125 bed volume per minute for a period of 3 to 4 days. Rhenium was measured in the recovered elution solution exiting each column and results are shown as in Table 5. The average rhenium recovery from the copper leach solution was 96%. The average rhenium loading onto the stationary phase in column 1 was greater than 2000 mg Re per kg carbon.

TABLE 5

Average Rhenium Concentration of Copper Leach Solution exiting a Series of Four Activated Carbon Columns

| Column | Rhenium Concentration, mg/L |
| --- | --- |
| 1 | 0.314 |
| 2 | 0.155 |
| 3 | 0.072 |
| 4 | 0.025 |

Finally, as used herein, the terms "comprise", "comprises", "comprising", "having", "including", "includes", or any variation thereof, are intended to reference a non-exclusive inclusion, such that a process, method, article, composition or apparatus that comprises a list of elements does not include only those elements recited, but can also include other elements not expressly listed and equivalents inherently known or obvious to those of reasonable skill in the art. Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters or other operating requirements without departing from the scope of the instant invention and are intended to be included in this disclosure.

Moreover, unless specifically noted, it is the Applicants' intent that the words and phrases in the specification and the claims be given the commonly accepted generic meaning or an ordinary and accustomed meaning used by those of reasonable skill in the applicable arts. In the instance where these meanings differ, the words and phrases in the specification and the claims should be given the broadest possible, generic meaning. If it is intended to limit or narrow these meanings, specific, descriptive adjectives will be used. Absent the use of these specific adjectives, the words and phrases in the specification and the claims should be given the broadest possible meaning. If any other special meaning is intended for any word or phrase, the specification will clearly state and define the special meaning.

Various embodiments and the examples described herein are exemplary and not intended to be limiting in describing the full scope of compositions and methods of this invention. Equivalent changes, modifications and variations of various embodiments, materials, compositions and methods may be made within the scope of the present invention, with substantially similar results.

The invention claimed is:

1. A method for recovering rhenium, the method comprising:
    feeding a metal-bearing leach solution comprising rhenium and copper over activated carbon to produce a remainder solution;
    feeding said remainder solution into an ion exchange to produce an electrowinning solution;
    recovering copper from the electrowinning solution; and
    recovering rhenium from at least one of the activated carbon and the ion exchange.

2. The method according to claim 1, wherein the recovering of rhenium from the activated carbon further comprises:
    adsorbing said rhenium onto said activated carbon;
    heating a basic aqueous solution to a temperature greater than about 105° C.; and
    recovering said rhenium by eluting said rhenium from said activated carbon with said basic aqueous solution.

3. The method according to claim 2, wherein said basic aqueous solution comprises a hydroxide salt.

4. The method according to claim 3, wherein said hydroxide salt is at least one of sodium hydroxide, ammonium hydroxide, lithium hydroxide, and potassium hydroxide.

5. The method according to claim 3, wherein said hydroxide salt is present in said basic aqueous solution in an amount from about 0.2% to about 5%.

6. The method according to claim 3, wherein said hydroxide salt is sodium hydroxide in an amount from about 0.5% to about 2.5%.

7. The method according to claim 2, wherein said rhenium eluted from said activated carbon is greater than about 95% of rhenium in said metal-bearing leach solution.

8. The method according to claim 2, wherein the basic aqueous solution is heated to a temperature from about 105° C. to about 115° C.

9. The method according to claim 2, wherein the basic aqueous solution is heated to a temperature from about 108° C. to about 110° C.

10. The method according to claim 1, further comprising leaching a metal-bearing material to yield said metal-bearing each solution.

11. The method according to claim 1, wherein said leach solution comprises less than 1 mg/L rhenium.

\* \* \* \* \*